United States Patent
Watanabe et al.

(10) Patent No.: US 11,735,925 B2
(45) Date of Patent: Aug. 22, 2023

(54) COMMAND GENERATION DEVICE AND COMMAND GENERATION METHOD

(71) Applicant: MITSUBISHI HEAVY INDUSTRIES ENGINE & TURBOCHARGER, LTD., Sagamihara (JP)

(72) Inventors: Kazuki Watanabe, Tokyo (JP); Masato Mitsuhashi, Tokyo (JP); Osamu Nakakita, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 87 days.

(21) Appl. No.: 17/426,574

(22) PCT Filed: Sep. 13, 2019

(86) PCT No.: PCT/JP2019/036021
§ 371 (c)(1),
(2) Date: Jul. 28, 2021

(87) PCT Pub. No.: WO2020/158037
PCT Pub. Date: Aug. 6, 2020

(65) Prior Publication Data
US 2022/0102980 A1 Mar. 31, 2022

(30) Foreign Application Priority Data
Feb. 1, 2019 (JP) .................................. 2019-017462

(51) Int. Cl.
*H02J 3/38* (2006.01)
*H02M 7/5387* (2007.01)

(52) U.S. Cl.
CPC ......... *H02J 3/381* (2013.01); *H02M 7/53873* (2013.01); *H02J 2300/24* (2020.01)

(58) Field of Classification Search
CPC .... H02J 3/381; H02J 2300/24; H02J 2310/10; H02J 3/32; H02J 3/48; H02J 3/50; H02M 7/53873; Y02E 10/56
See application file for complete search history.

(56) References Cited

U.S. PATENT DOCUMENTS

| | | | |
|---|---|---|---|
| 2016/0006338 A1* | 1/2016 | Sakimoto | H02P 9/105 363/131 |
| 2020/0083709 A1 | 3/2020 | Umezu et al. | |
| 2021/0175711 A1* | 6/2021 | Yoshizawa | H02J 3/26 |

FOREIGN PATENT DOCUMENTS

| | | |
|---|---|---|
| CN | 108879726 A | 11/2018 |
| JP | 2014-168351 A | 9/2014 |

(Continued)

OTHER PUBLICATIONS

Tan Yingjie et al. "Enhanced Frequency Regulation Using Multi-level Energy Storage in Remote Area Power Supply Systems", IEEE Transactions on Power Systems, vol. 34, No. 1, Jan. 1, 2019, pp. 163-170.

(Continued)

*Primary Examiner* — Toan T Vu
(74) *Attorney, Agent, or Firm* — Birch, Stewart, Kolasch & Birch, LLP

(57) ABSTRACT

A rotation calculation unit calculates a rotation speed of a virtual generator on the basis of a rotor model to simulate driving of the virtual generator and calculates the rotation speed of the virtual generator. A target power determination unit determines target values of active power and reactive power of an inverter on the basis of the calculated rotation speed. A command generation unit generates a control command for the inverter on the basis of the determined target values of the active power and the reactive power.

4 Claims, 8 Drawing Sheets

(56) References Cited

FOREIGN PATENT DOCUMENTS

| | | |
|---|---|---|
| JP | 2016-10252 A | 1/2016 |
| JP | 2016-220396 A | 12/2016 |
| JP | 6084863 B2 | 2/2017 |
| JP | 2017-127141 A | 7/2017 |
| JP | 2017-208932 A | 11/2017 |
| JP | 2018-107959 A | 7/2018 |

OTHER PUBLICATIONS

International Search Report for International Application No. PCT/JP2019/036021, dated Nov. 19, 2019, with an English translation.
Written Opinion of the International Searching Authority for International Application No. PCT/JP2019/036021, dated Nov. 19, 2019, with an English translation.

* cited by examiner

COMMAND GENERATION DEVICE AND COMMAND GENERATION METHOD

TECHNICAL FIELD

The present invention relates to a command generation device and a command generation method for generating a control command for an inverter of a DC power source device.

Priority is claimed on Japanese Patent Application No. 2019-017462, filed Feb. 1, 2019, the content of which is incorporated herein by reference.

BACKGROUND ART

Patent Document 1 discloses a technique for stabilizing a system by giving an inverter functions of a governor and an automatic voltage regulator (AVR) of a synchronous generator.

CITATION LIST

Patent Document

Patent Document 1: Japanese Unexamined Patent Application, First Publication No. 2017-208932

SUMMARY OF INVENTION

Technical Problem

According to the technique disclosed in Patent Document 1, the inverter controls active power, reactive power, and a voltage frequency on the basis of a model of the synchronous generator. However, since a general inverter outputs AC power in synchronization with a voltage frequency of a bus by using a phase lock loop (PLL) circuit, the voltage frequency cannot be controlled on the basis of the model of the synchronous generator.

An object of the present invention is to provide a command generation device and a command generation method capable of stabilizing a system against a load variation by using an inverter that converts DC power output from a DC power source device into AC power synchronized with a frequency of a bus.

Solution to Problem

According to a first aspect of the present invention, there is provided a command generation device for generating a control command for an inverter configured to convert DC power output from a DC power source device into AC power synchronized with a frequency of a bus, the command generation device including: a rotation calculation unit configured to calculate a rotation speed of a virtual generator on the basis of a rotor model to simulate driving of the virtual generator and calculate the rotation speed of the virtual generator; a target power determination unit configured to determine target values of active power and reactive power of the inverter on the basis of the calculated rotation speed; and a command generation unit configured to generate a control command for the inverter on the basis of the determined target values of the active power and the reactive power.

According to a second aspect of the present invention, the command generation device according to the first aspect may further include a rotation target determination unit configured to determine, on the basis of active power of the bus, a target value of the rotation speed of the virtual generator configured to monotonically decrease with respect to the active power, and the rotation calculation unit may calculate the rotation speed of the virtual generator on the basis of the rotor model and the determined target value of the rotation speed.

According to a third aspect of the present invention, the command generation device according to the second aspect may further include a function update unit configured to update an intercept of a droop function such that the droop function passes through an active power command and a voltage frequency of the bus, and the rotation target determination unit may determine the target value of the rotation speed on the basis of the droop function for defining a relationship between the active power of the bus and the target value of the rotation speed of the virtual generator.

According to a fourth aspect of the present invention, the command generation device according to any one of the first to third aspects may further include a drive torque calculation unit configured to calculate a value related to a drive torque of the virtual generator on the basis of a governor model to determine a value related to the drive torque of the virtual generator, wherein the governor model determines the value on the basis of a difference between an active voltage and an active power command of the bus, a difference between a target value of the rotation speed of the virtual generator and the calculated rotation speed, and a difference between a target value and a measured value of a bus voltage, and the rotation calculation unit may calculate a value related to rotation of the virtual generator on the basis of the calculated value related to the drive torque and the rotor model.

According to a fifth aspect of the present invention, there is provided a command generation method of generating a control command for an inverter configured to convert DC power output from a DC power source device into AC power synchronized with a frequency of a bus, the command generation method including a step of calculating a rotation speed of a virtual generator on the basis of a rotor model that simulates driving of the virtual generator and calculates the rotation speed of the virtual generator; a step of determining a target value of active power of the inverter on the basis of the calculated rotation speed; and a step of generating a control command for the inverter on the basis of the determined target value of the active power.

Advantageous Effects of Invention

According to at least one of the aspects, the command generation device can stabilize a system against a load variation by using an inverter that converts DC power output from a DC power source device into AC power synchronized with a frequency of a bus.

DESCRIPTION OF EMBODIMENTS

First Embodiment

Figure 1:
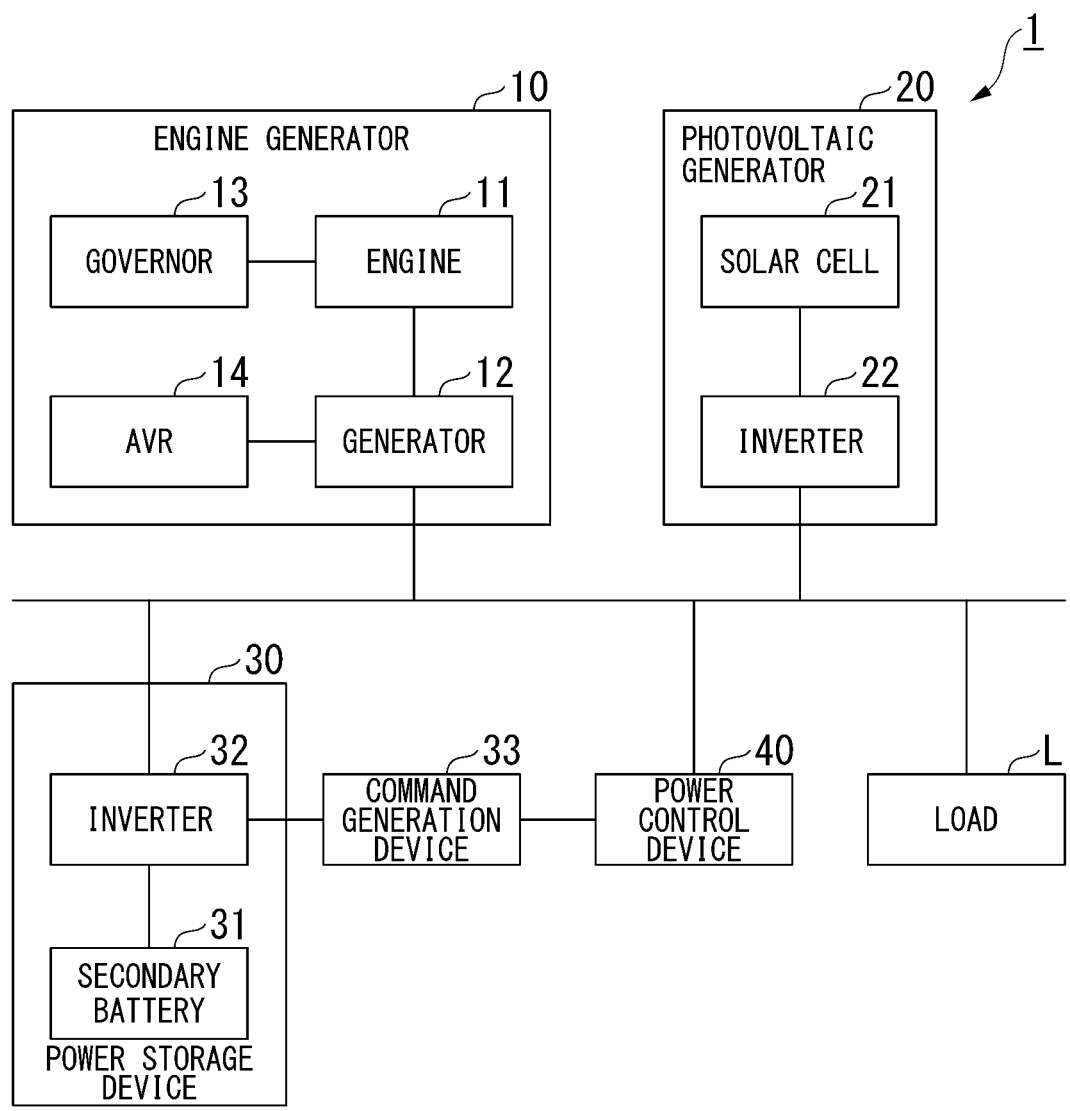
FIG. 1 is a schematic block diagram illustrating a configuration of a power supply system according to a first embodiment.

FIG. 1 is a schematic block diagram illustrating a configuration of a power supply system according to a first embodiment.

(Configuration of Power Supply System)

A power supply system 1 according to a first embodiment includes an engine generator 10, a photovoltaic generator 20, a power storage device 30, a command generation device 33, and a power control device 40. The power supply system 1 supplies power to a load L through an autonomous operation. In other words, the power supply system 1 is a so-called microgrid system or an off-grid system. The engine generator 10, the photovoltaic generator 20, and the power storage device 30 are connected to a bus and supply power to the load L via the bus.

The engine generator 10 includes an engine 11, a generator 12, a governor 13, and an automatic voltage regulator (AVR) 14. The engine generator 10 is an AC generator that generates AC power by driving the generator 12 through rotation of the engine 11.

The governor 13 controls a rotation speed of the engine 11 according to the Hz-kW droop characteristic. A governor characteristic of the engine generator 10 is represented by, for example, a slope of a linear function connecting a plot related to a rated output and a rated frequency to a plot related to a settling frequency that settles in a no-load state when a load is cut off from the zero output and the rated output. That is, the Hz-kW droop characteristic is a characteristic in which an output decreases as a frequency increases. In other embodiments, the governor characteristic may be realized through proportional integral differential (HD) control. The AVR 14 regulates a terminal voltage of the generator 12 by controlling a current supplied to a field winding of the generator 12 according to the V-kbar droop characteristic. The V-kbar droop characteristic is a characteristic in which reactive power decreases as a voltage increases. In other embodiments, another AC generator may be used instead of the engine generator 10.

The photovoltaic generator 20 includes a solar cell 21 and an inverter 22. The solar cell 21 is a DC power source device that converts sunlight into DC power. The inverter 22 converts the DC power generated by the solar cell 21 into AC power. The inverter 22 and the solar cell 21 do not necessarily have to be provided in a one-to-one ratio. For example, a plurality of solar cells 21 may be connected to one inverter 22. In other embodiments, instead of the photovoltaic generator 20, another renewable energy generator such as a wind power generator may be used.

The power storage device 30 includes a secondary battery 31 and an inverter 32.

A control command for the inverter 32 includes a target value of active power and a target value of reactive power. The inverter 32 converts DC power output by the secondary battery 31 into AC power synchronized with a voltage frequency of the bus and supplies the AC power to the bus on the basis of a command from the command generation device 33. The inverter 32 synchronizes output power with the voltage frequency of the bus according to PLL control. The inverter 32 converts some AC power flowing through the bus into DC power to charge the secondary battery 31 on the basis of a control command that is generated by the command generation device 33 on the basis of a command from the power control device 40. As the secondary battery 31, for example, a lithium-ion secondary battery may be used. The inverter 32 is a general-purpose current control type inverter that is operated according to a control command related to P-Q control. The inverter 32 according to other embodiments may be operated according to a control command related to a target value of apparent power, a target value of power factor angle, and a target value of a voltage frequency.

The inverter 32 and the secondary battery 31 do not necessarily have to be provided in a one-to-one ratio. For example, a plurality of secondary batteries 31 may be connected to one inverter 32.

The command generation device 33 generates a control command for controlling the inverter 32 of the power storage device 30 on the basis of a command from the power control device 40, and outputs the control command to the power storage device 30. The command generation device 33 is a device provided separately from the power storage device 30.

The power control device 40 monitors a power value of the bus and outputs a charge/discharge command to the engine generator 10 and the power storage device 30. For example, the power control device 40 outputs a power command for reducing or stopping generated power to the engine generator 10 in a case where the power generated by the photovoltaic generator 20 is equal to or more than a predetermined threshold value, such as in the daytime. The power control device 40 outputs a power command for increasing generated power to the engine generator 10 in a case where the power generated by the photovoltaic generator 20 is less than the predetermined threshold value, such as at night or in bad weather.

For example, on the basis of a variation in the power generated by the photovoltaic generator 20, the power control device 40 outputs a charge/discharge command for smoothing the variation to the power storage device 30. The power control device 40 compares a power value of the bus with a power value required by the load L, and outputs a charge/discharge command to the power storage device 30 on the basis of a power difference.

(Configuration of Command Generation Device)

Figure 2:
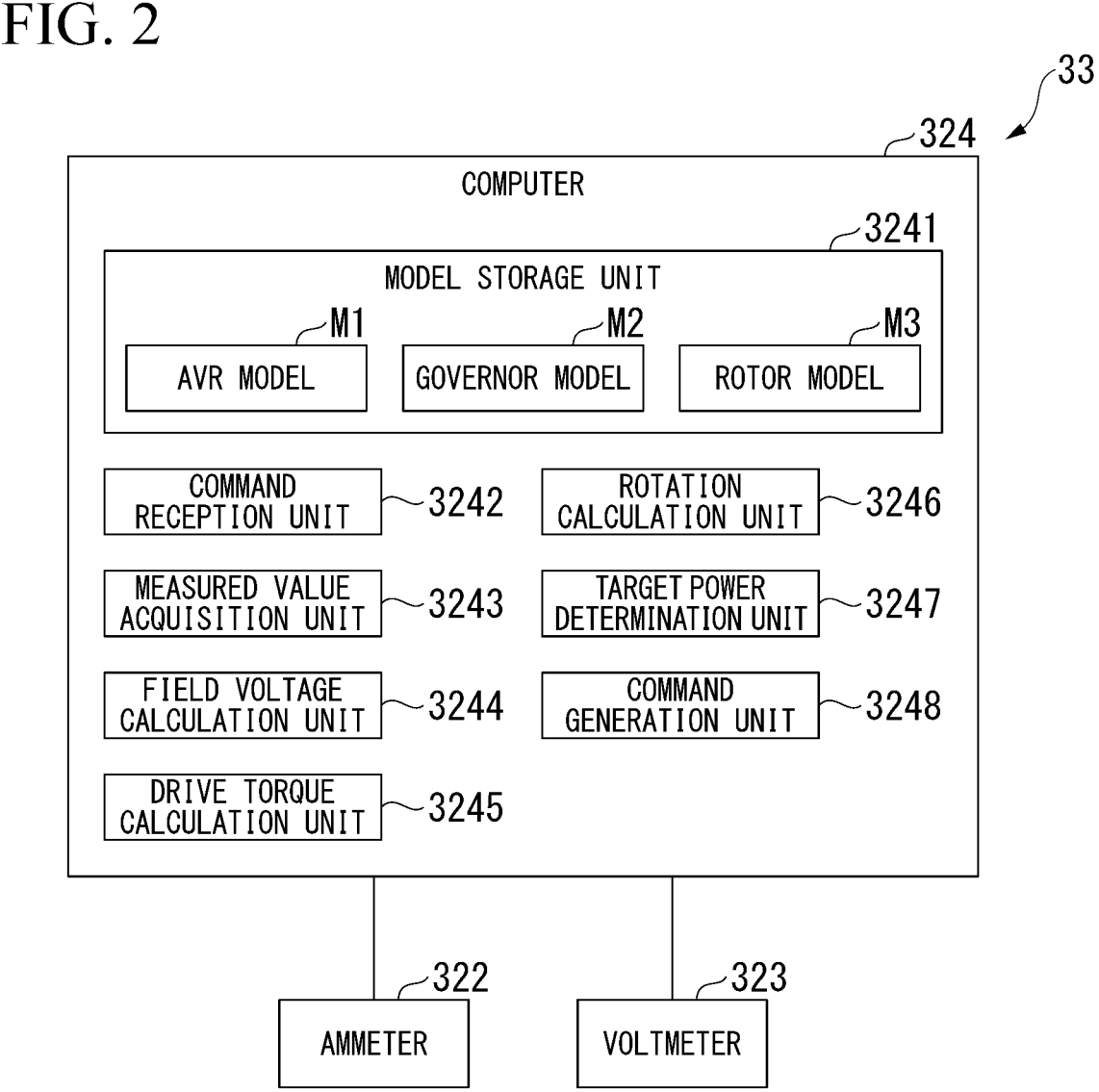
FIG. 2 is a schematic block diagram illustrating a configuration of a command generation device according to the first embodiment.

FIG. 2 is a schematic block diagram illustrating a configuration of the command generation device according to the first embodiment.

The command generation device 33 according to the first embodiment includes an ammeter 322, a voltmeter 323, and a computer 324. The ammeter 322 measures a current at an output end of the inverter 32. The voltmeter 323 measures a voltage at an output end of the inverter 32. The computer 324 generates a control command on the basis of the measured values of the ammeter 322 and the voltmeter 323.

The computer 324 includes a model storage unit 3241, a command reception unit 3242, a measured value acquisition unit 3243, a field voltage calculation unit 3244, a drive torque calculation unit 3245, a rotation calculation unit 3246, a target power determination unit 3247, and a command generation unit 3248.

The model storage unit 3241 stores a mathematical model that simulates a behavior of a virtual generator. Specifically, the model storage unit 3241 stores an AVR model M1 that simulates a behavior of an AVR of the virtual generator, a governor model M2 that simulates a behavior of a governor of the virtual generator, and a rotor model M3 that simulates a behavior of a rotor of the virtual generator. The AVR model M1 receives a measured value of reactive power, a command value for reactive power, an effective voltage value, and an effective voltage command value and outputs a field voltage and electric torque of the virtual generator. The governor model M2 receives a measured value of active power, an active power command value, an angular velocity of the rotor of the virtual generator, and an angular velocity command value and outputs a drive torque value of the virtual generator. The rotor model M3 receives an electric torque value and a drive torque value of the virtual generator and outputs an angular velocity and a phase angle of the rotor of the virtual generator. Details of each mathematical model will be described later.

The command reception unit 3242 receives a charge/discharge command from the power control device 40. The charge/discharge command includes an active power command value, a reactive power command value, an effective voltage command value, and an angular velocity command value.

The measured value acquisition unit 3243 acquires measured values in the ammeter 322 and the voltmeter 323. The measured value acquisition unit 3243 calculates a voltage value and a current value that contribute to active power of the output end, and a voltage value and a current value that contribute to reactive power, an effective voltage value, an active power value, and a reactive power value, on the basis of the measured values in the ammeter 322 and the voltmeter 323 and a phase angle of the rotor of the virtual generator.

The field voltage calculation unit 3244 inputs the reactive power command value and the effective voltage command value received by the command reception unit 3242 and the reactive power value and the effective voltage value acquired by the measured value acquisition unit 3243 into the AVR model M1, and calculates a field voltage value and an electric torque value of the virtual generator. The field voltage value and the electric torque value of the virtual generator are examples of values related to a field voltage of the virtual generator.

The drive torque calculation unit 3245 inputs the active power command value and the angular velocity command value received by the command reception unit 3242, the measured value of the active power acquired by the measured value acquisition unit 3243, and an angular velocity of the rotor of the virtual generator calculated by the rotation calculation unit 3246 in the previous control into the governor model M2, and calculates a drive torque value of the virtual generator. The drive torque value is an example of a value related to a drive torque of the virtual generator.

The rotation calculation unit 3246 inputs the electric torque value calculated by the field voltage calculation unit 3244 and the drive torque value calculated by the drive torque calculation unit 3245 into the rotor model M3, and calculates an angular velocity and a phase angle of the rotor of the virtual generator. The angular velocity and the phase angle of the rotor of the virtual generator are examples of values related to rotation of the rotor of the virtual generator.

The target power determination unit 3247 determines a target value of active power and a target value of reactive power on the basis of the field voltage value calculated by the field voltage calculation unit 3244, the voltage value and the current value that contribute to the active power and the voltage value and the current value that contribute to the reactive power, acquired by the measured value acquisition unit 3243, and the phase angle of the rotor calculated by the rotation calculation unit 3246.

The command generation unit 3248 generates a control command for the inverter 32 on the basis of the target value of the active power and the target value of the reactive power determined by the target power determination unit 3247. The command generation unit 3248 outputs the generated control command to the inverter 32.

(Configuration of Mathematical Model)

Figure 3:
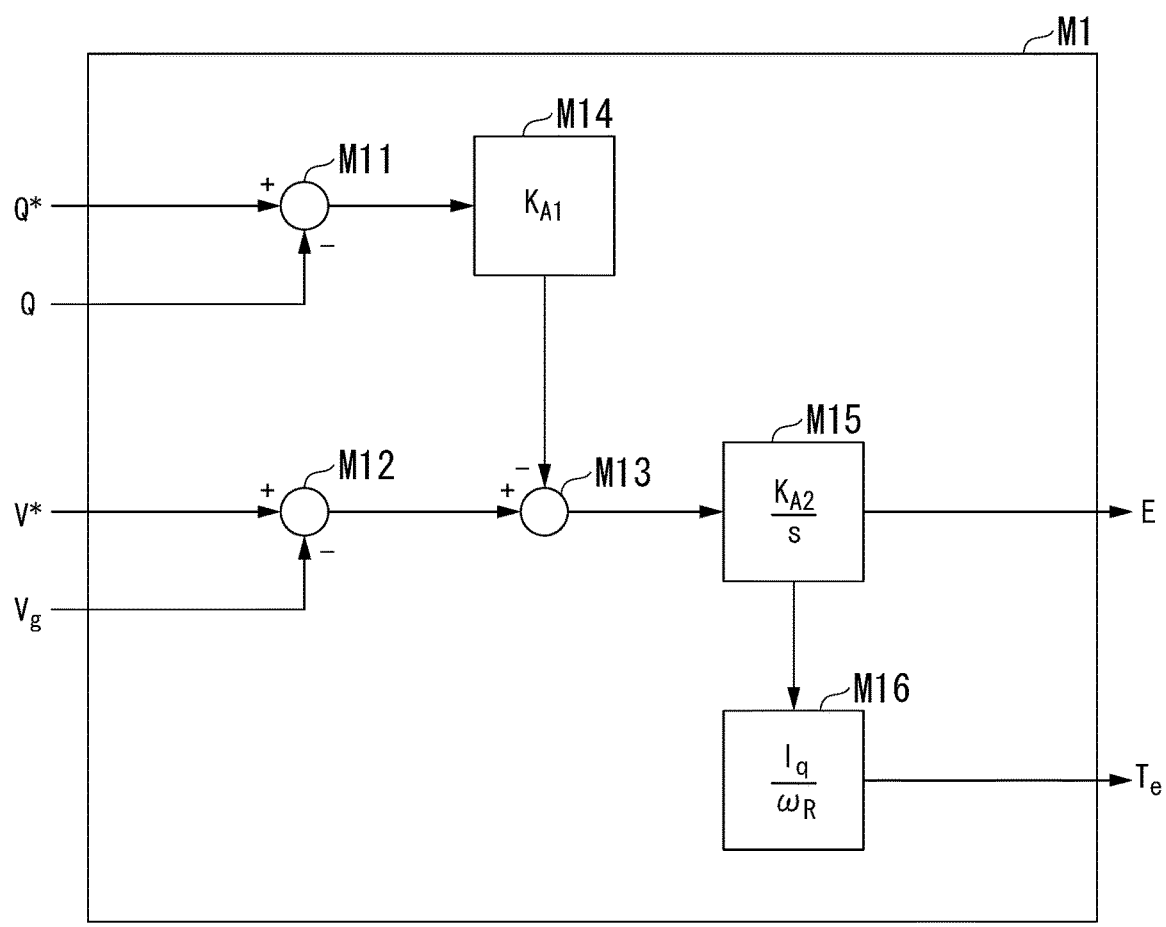
FIG. 3 is a block diagram illustrating an example of an AVR model according to the first embodiment.

FIG. 3 is a block diagram illustrating an example of the AVR model according to the first embodiment.

The AVR model M1 receives a reactive power measured value Q, a reactive power command value Q*, an effective voltage value $V_g$, and an effective voltage command value V* and outputs a field voltage value E and an electric torque value $T_e$ of the virtual generator. Specifically, the AVR model M1 includes addition points M11, M12, and M13, a P block M14, an I block M15, and a P block M16. The addition point M11 obtains a difference between the reactive power measured value Q and the reactive power command value Q*. The P block M14 performs P control using a proportional gain KA1 on the output from the addition point M11. The proportional gain KA1 corresponds to a V-kbar droop gain of the virtual generator. The addition point M12 obtains a difference between the effective voltage value $V_g$ and the effective voltage command value V*. The addition point M13 obtains a difference between the output from the addition point M12 and the output from the P block M14. The I block M15 obtains the field voltage value E by performing integral control using an integral gain KA2 on the output from the addition point M13. The P block M16 obtains the electric torque $T_c$ of the virtual generator by multiplying the field voltage value E by a reactive current value $I_q$ and dividing a multiplication result by an angular velocity ωR of the rotor.

Figure 4:
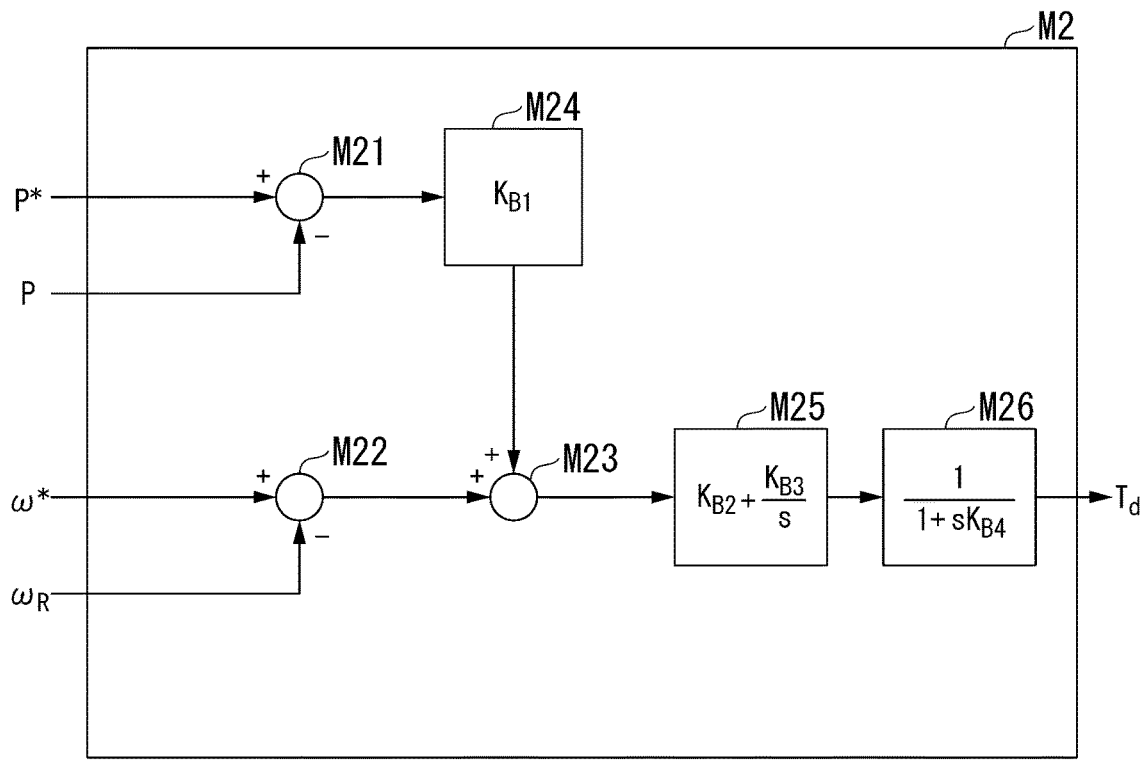
FIG. 4 is a block diagram illustrating an example of a governor model according to the first embodiment.

FIG. 4 is a block diagram illustrating an example of the governor model according to the first embodiment.

The governor model M2 receives an active power measured value P, an active power command value P*, the angular velocity $ω_R$ of the rotor of the virtual generator, and a target value ω* of the angular velocity, and outputs a drive torque value $T_d$ of the virtual generator. Specifically, the governor model M2 includes addition points M21, M22, and M23, a P block M24, a PI block M25, and a primary delay block M26. The addition point M21 obtains a difference between the active power measured value P and the active power command value P*. The P block M24 performs P control using proportional gain KB1 on the output from the addition point M21. The proportional gain KB1 corresponds to a Hz-kW droop gain of the virtual generator. The addition point M22 obtains a difference between the angular velocity ωR of the rotor of the virtual generator and the target value ω* of the angular velocity. The addition point M23 obtains a sum of the output from the addition point M22 and the output from the P block M24. The PI block M25 performs PI control using a proportional gain KB2 and an integral gain KB3 on the output from the addition point M23. The primary delay block M26 performs primary delay control related to a time constant KB4 on the output from the PI block M25 to obtain a drive torque value $T_d$.

Figure 5:
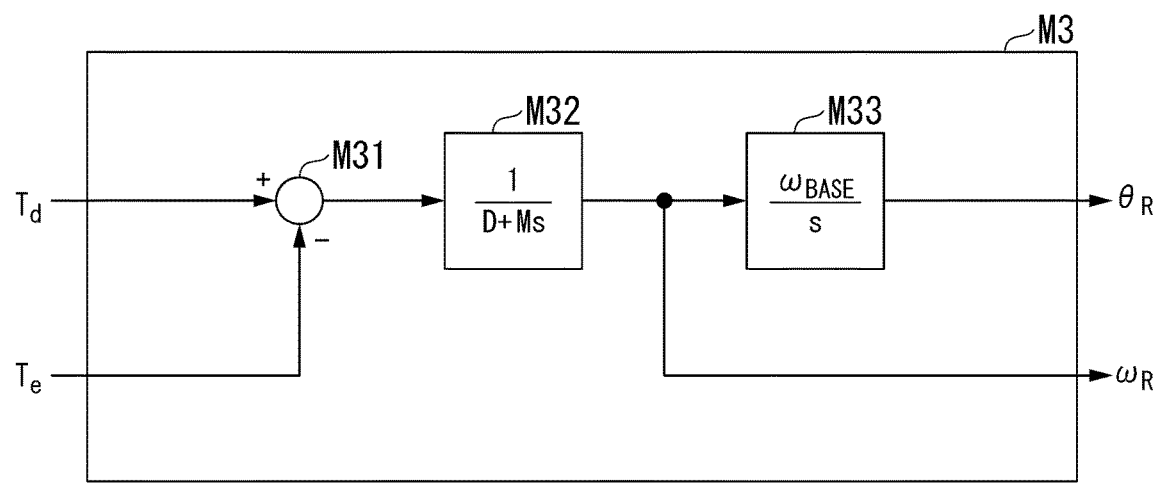
FIG. 5 is a block diagram illustrating an example of a rotor model according to the first embodiment.

FIG. 5 is a block diagram illustrating an example of the rotor model according to the first embodiment.

The rotor model M3 receives the electric torque value $T_e$ and the drive torque value $T_d$ of the virtual generator and outputs an angular velocity $\omega_R$ and a phase angle $\theta_R$ of the rotor of the virtual generator. Specifically, the rotor model M3 includes an addition point M31, a primary delay block M32, and an I block M33. The addition point M31 obtains a difference between the electric torque $T_e$ and the drive torque $T_d$ of the virtual generator. The primary delay block M32 performs primary delay control related to a primary delay gain 1/D and a time constant M/D on the output from the addition point M31 to obtain the angular velocity CUR of the rotor. The I block M33 integrates the angular velocity ωR of the rotor and multiplies an integral result by a proportional gain $\omega_{BASE}$ to obtain the phase $\theta_R$ of the rotor of the virtual generator. The proportional gain $\omega_{BASE}$ is a reference frequency of the bus.

(Operation)

With the above configuration, the computer 324 obtains a rotation angle, an angular velocity, and a field voltage value of the virtual generator by using the active power command value, the reactive power command value, the effective voltage command value, the angular velocity command value, and the measured values in the ammeter 322 and the voltmeter 323 on the basis of the AVR model M1, the governor model M2, and the rotor model M3. The computer 324 determines an active power target value and a reactive power target value by using the rotation angle, the angular velocity, and the field voltage value of the virtual generator, and generates a control command for the inverter 32 on the basis of the obtained target values. The inverter 32 is operated according to the control command generated by the command generation device 33, and thus characteristics corresponding to the virtual generator are realized.

Advantageous Effects

The command generation device 33 according to the first embodiment calculates a rotation speed of the virtual generator on the basis of the rotor model M3, and outputs a target value of active power of the inverter 32 determined on the basis of the calculated rotation speed to the inverter 32 as a control command Here, the command generation device 33 according to the first embodiment does not designate a target value of a voltage frequency in the control command for the inverter 32. That is, AC power output by the inverter 32 is synchronized with a voltage frequency of the bus, and the command generation device 33 controls a magnitude of active power of the AC power. Consequently, the command generation device 33 according to the first embodiment can stabilize the system against a load variation by using the inverter 32 that converts DC power output from the DC power source device into AC power synchronized with a frequency of the bus.

Second Embodiment

A command generation device 33 according to a second embodiment compensates for a variation in a voltage frequency of the bus due to a variation in the load L without controlling the voltage frequency of the inverter 32.

Figure 6:
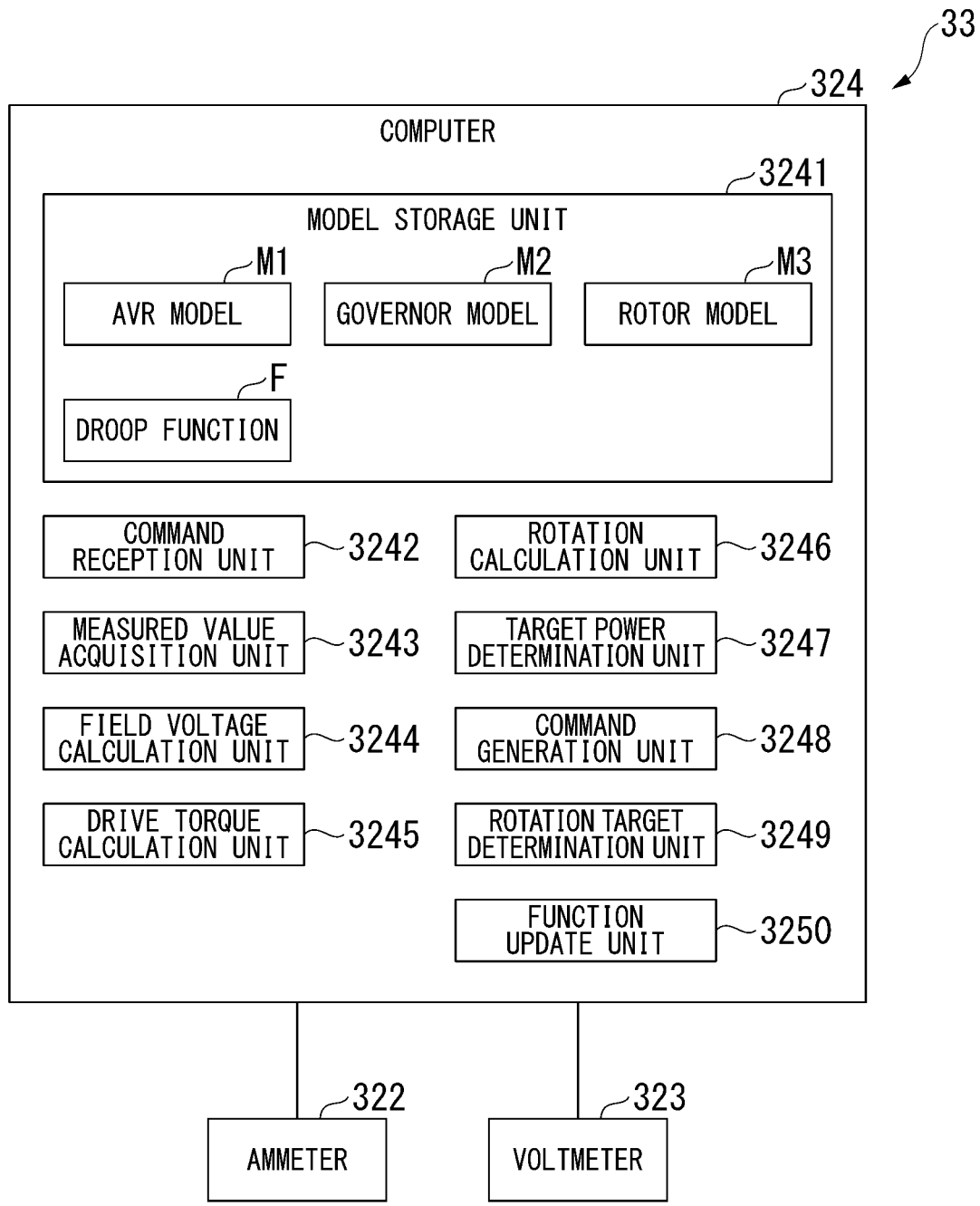
FIG. 6 is a schematic block diagram illustrating a configuration of a command generation device according to a second embodiment.

FIG. 6 is a schematic block diagram illustrating a configuration of the command generation device according to the second embodiment.

The command generation device 33 according to the second embodiment further includes a rotation target determination unit 3249 and a function update unit 3250 in addition to the configuration of the first embodiment. The model storage unit 3241 further stores a droop function F.

Figure 7:
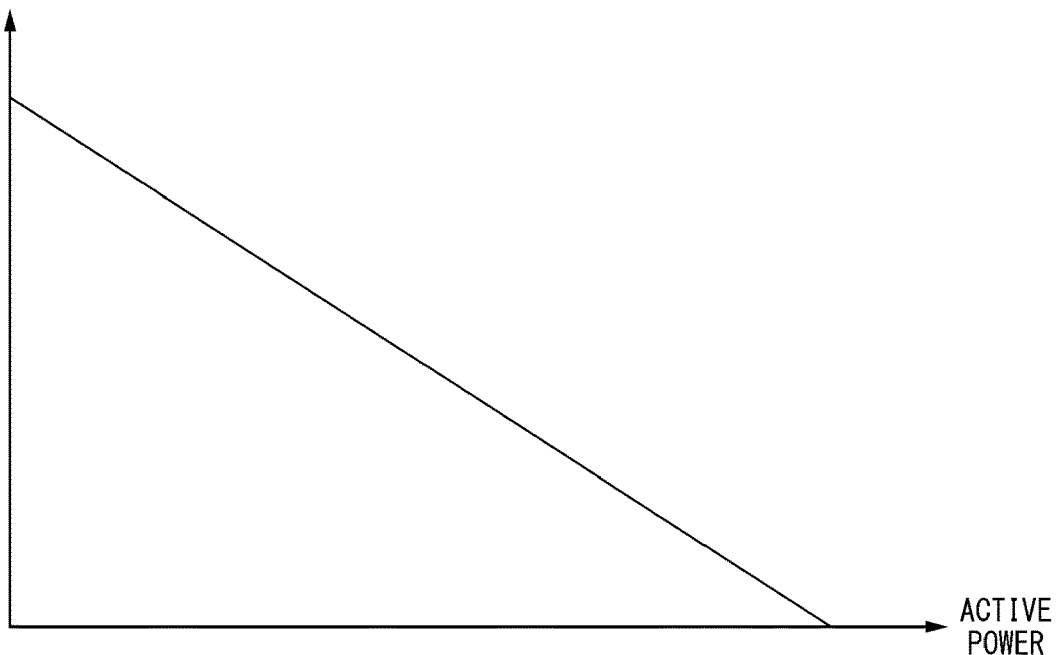
FIG. 7 is diagram illustrating a droop function according to the second embodiment.

FIG. 7 is a diagram illustrating the droop function according to the second embodiment.

The droop function F represents a relationship between an angular velocity of the rotor of the virtual generator and active power of the bus. In the droop function F, the active power monotonically decreases with respect to the angular velocity of the rotor of the virtual generator. A slope of the droop function F may be the same slope as the droop characteristic of the governor 13.

The rotation target determination unit 3249 determines a target value of the angular velocity of the rotor of the virtual generator by assigning the measured value of the active power of the bus to the droop function F stored in the model storage unit 3241.

In a case where the command reception unit 3242 receives a command value of bus power, the function update unit 3250 updates an intercept of the droop function F according to a value (a value obtained by applying a low-pass filter) related to temporary delay of a difference between command values of the active power before and after a change. Specifically, a value obtained by subtracting the command value of the active power before the change from the command value of the active power after the change is added to an intercept of the active power axis of the current droop function F. That is, the function update unit 3250 does not change the slope when updating the droop function F.

(Method of Updating Droop Function)

Figure 8:
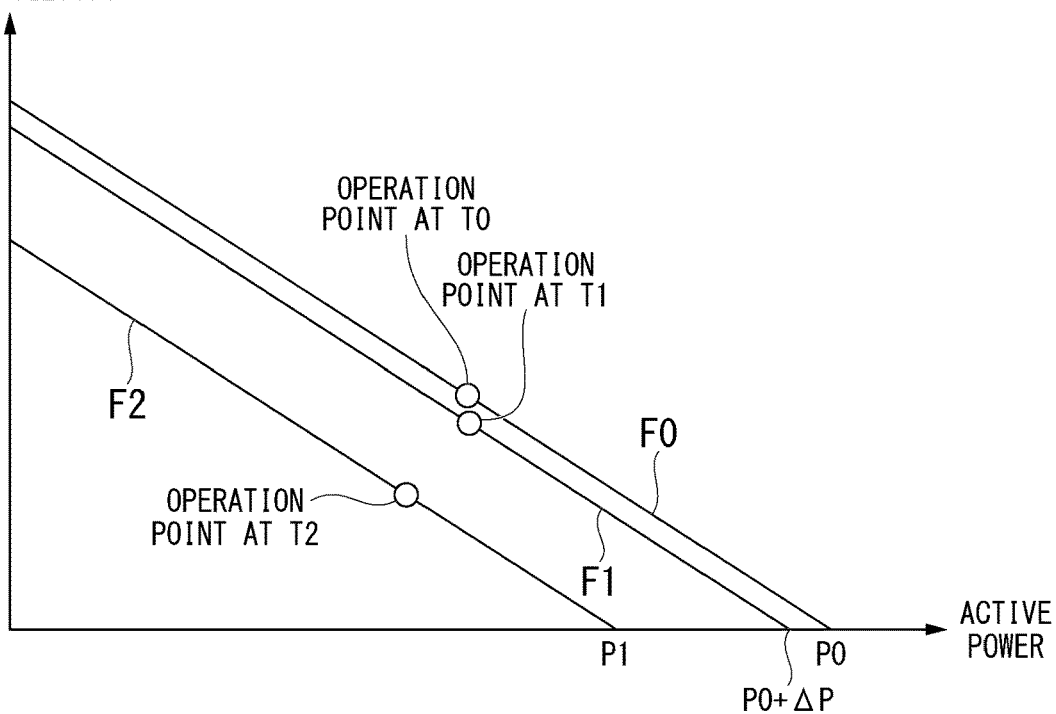
FIG. 8 is a diagram illustrating a method of updating the droop function according to the second embodiment.

FIG. 8 is a diagram illustrating a method of updating the droop function according to the second embodiment.

Here, a method of updating the droop function F will be described with an example. At time point T0, the model storage unit 3241 stores a droop function F0. The droop function F0 is a function in which an intercept of the active power axis is P0. Therefore, the rotation target determination unit 3249 determines the target value of the angular velocity of the rotor by assigning the active power of the bus to the droop function F0.

Here, it is assumed that the command reception unit 3242 receives P1 as the command value of the active power from the power control device 40 at time point T1. In this case, the function update unit 3250 calculates ΔP by temporarily delaying a deviation P1–P0 of the command value of the active power, and updates the intercept of the active power axis of the droop function F0 to P1+ΔP to obtain a droop function F1. The function update unit 3250 rewrites the droop function F0 to the droop function F1. Thus, at time point T1, the rotation target determination unit 3249 determines the target value of the angular velocity of the rotor by assigning the active power of the bus to the droop function F1. In the example illustrated in FIG. 8, since the command value of the active power is reduced, the intercept of the active power axis is reduced at time point T1. Along with this, the rotation target determination unit 3249 determines the target value of the angular velocity to a value slightly smaller than that at the time point T0. That is, the function update unit 3250 updates the intercept of the droop function on the basis of the value related to the temporary delay of the deviation P1–P0 of the command value, and can thus prevent the occurrence of hunting due to sudden change in the target value of the angular velocity.

As the target value of the angular velocity becomes smaller, the drive torque calculated by the drive torque calculation unit 3245 becomes smaller, and the angular velocity calculated by the rotation calculation unit 3246, that is, an increment of the phase of the rotor, also becomes smaller. Consequently, the command generation device 33 can reduce the active power that is output by updating the droop function F.

At time point T2, a value of the intercept of the active power axis in the droop function F reaches P1. That is, at time point T2, the rotation target determination unit 3249 determines the target value of the angular velocity of the rotor by assigning the active power of the bus to the droop function F2. Consequently, the rotation target determination unit 3249 can determine the target value of the angular velocity according to the droop function even after the command value of the active power is changed. That is, the command generation device 33 according to the second embodiment can compensate for a variation in a voltage frequency of the bus due to a variation in the load L without controlling a voltage frequency of the inverter 32.

Third Embodiment

A command generation device 33 according to a third embodiment can stabilize power of the bus even in a case where the supply of power from an AC generator to the bus is stopped, such as a case where the engine generator 10 is disconnected.

The command generation device 33 according to the third embodiment has the same configuration as that of the command generation device 33 according to the first embodiment. On the other hand, the governor model M2 according to the third embodiment is different from the governor model according to the first embodiment.

Figure 9:
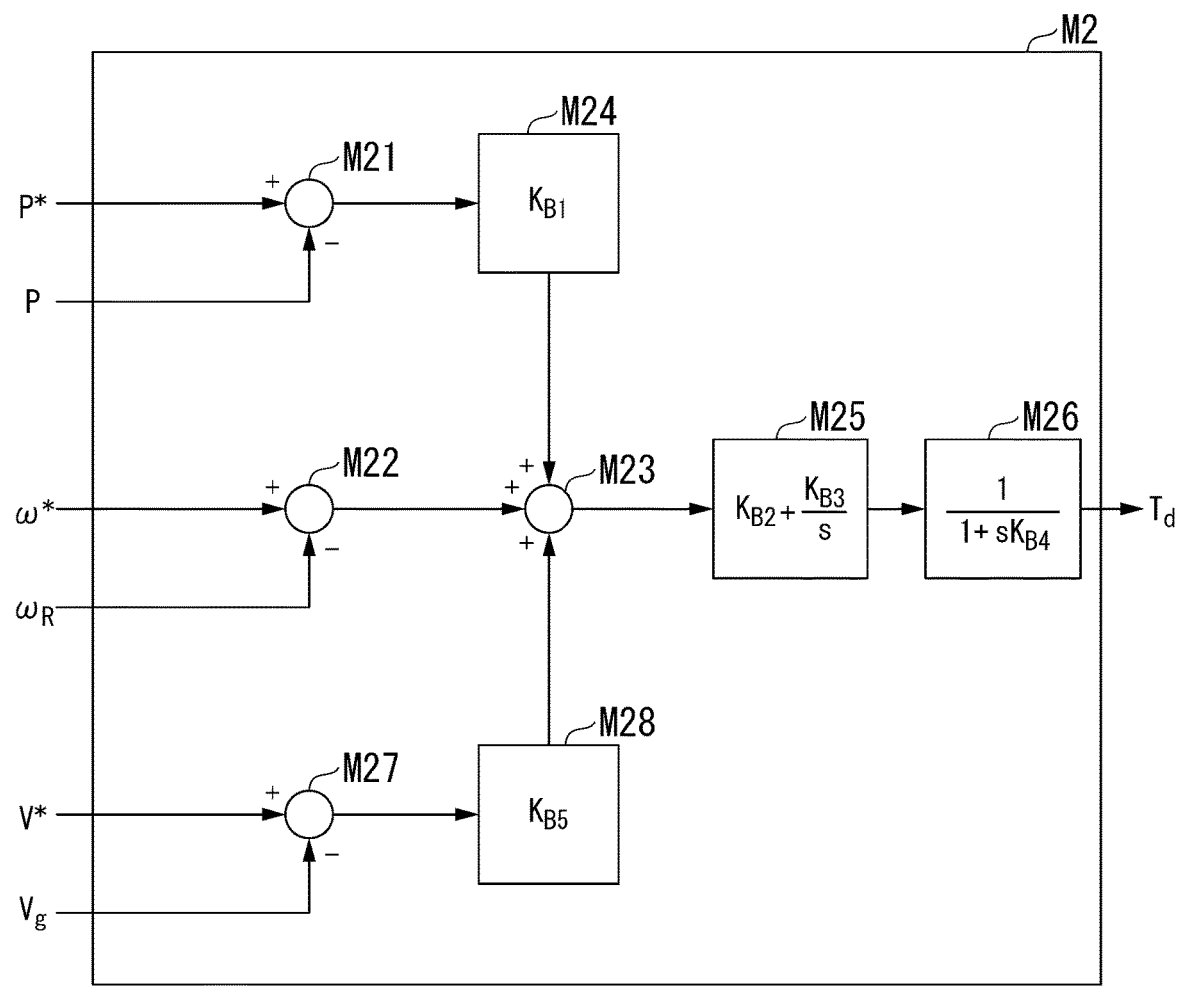
FIG. 9 is a block diagram illustrating an example of a governor model according to a third embodiment.

FIG. 9 is a block diagram illustrating an example of the governor model according to the third embodiment.

The governor model M2 according to the third embodiment further includes an addition point M27 and a P block M28 in addition to the configuration according to the first embodiment. The addition point M27 obtains a difference between the bus voltage measured value V and the bus effective voltage command value V*. In other embodiments, the output from the addition point M12 of the AVR model M1 may be obtained instead of the addition point M27. The P block M28 performs P control using a proportional gain KB5 on the output from the addition point M27. The addition point M23 obtains a sum of the output from the addition point M22, the output from the P block M24, and the output from the P block M28. That is, according to the governor model M2 according to the third embodiment, active power to be output can be varied not only by the frequency deviation but also by the voltage deviation.

In a case where bus power is supplied only by the power source device via the inverter, only a bus voltage changes when a load changes, and thus a voltage frequency does not vary. In contrast, the command generation device 33 according to the third embodiment varies output active power not only according to the frequency deviation but also according to the voltage deviation. Consequently, the command generation device 33 according to the third embodiment can give the inverter 32 a synchronization force even in a case where the bus power is supplied only by the power source device via the inverter.

Other Embodiments

Although one embodiment has been described in detail with reference to the drawings, a specific configuration is not limited to the above description, and various design changes and the like can be made.

For example, the configurations of the PID control blocks in the model according to the above-described embodiments are only examples, and, in other embodiments, may be replaced with other HD control blocks. For example, in other embodiments, the P block M14 of the AVR model M1 may be replaced with an I block, a D block, a PI block, and the like.

(Computer Configuration)

Figure 10:
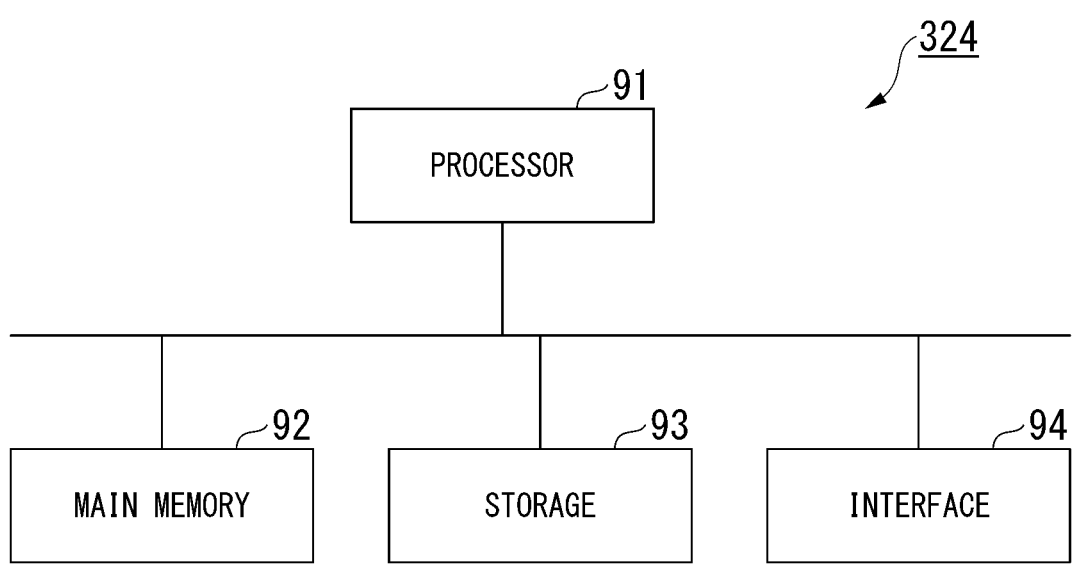
FIG. 10 is a schematic block diagram illustrating a configuration of a computer according to at least one of the embodiments.

FIG. 10 is a schematic block diagram illustrating a configuration of a computer according to at least one of the embodiments.

The computer 324 according to at least one embodiment includes a processor 91, a main memory 92, a storage 93, and an interface 94.

An operation of each processing unit described above is stored in the storage 93 in a program format. The processor 91 reads a program from the storage 93, loads the program to the main memory 92, and executes the above-described process according to the program. The processor 91 secures a storage region corresponding to each of the above-described storage units in the main memory 92 according to the program.

The program may realize some of the functions realized by the computer 324. For example, the program may realize the functions in combination with another program already stored in the storage 93 or in combination with another program installed in another device. In other embodiments, the computer 324 may include a custom large scale integrated circuit (LSI) such as a programmable logic device (PLD) in addition to or instead of the above configuration. Examples of the PLD include a programmable array logic (PAL), a generic array logic (GAL), a complex programmable logic device (CPLD), and a field programmable gate array (FPGA). In this case, some or all of the functions realized by the processor 91 may be realized by the integrated circuit.

Examples of the storage 93 include a hard disk drive (HDD), a solid state drive (SSD), a magnetic disk, a magneto optical disk, a compact disc read only memory (CD-ROM), a digital versatile disc read only memory (DVD-ROM), semiconductor memory, and the like. The storage 93 may be an internal medium directly connected to the bus of computer 324, or an external medium connected to computer 324 via the interface 94 or a communication line. In a case where the program is distributed to the computer 324 via a communication line, the computer 324 may load the distributed program to the main memory 92 and execute the above-described process. In at least one embodiment, the storage 93 is a non-transitory tangible storage medium.

The program may realize some of the functions. The program may be a so-called difference file (difference program) that realizes the functions in combination with another program already stored in the storage 93.

INDUSTRIAL APPLICABILITY

The command generation device can stabilize a system against a load variation by using an inverter that converts DC power output from a DC power source device into AC power synchronized with a frequency of a bus.

REFERENCE SIGNS LIST

1 Power supply system
10 Engine generator
11 Engine
12 Generator

13 Governor
14 AVR
20 Photovoltaic generator
21 Solar cell
22 Inverter
30 Power storage device
31 Secondary battery
32 Inverter
33 Command generation device
322 Ammeter
323 Voltmeter
324 Computer
3241 Model storage unit
3242 Command reception unit
3243 Measured value acquisition unit
3244 Field voltage calculation unit
3245 Drive torque calculation unit
3246 Rotation calculation unit
3247 Target power determination unit
3248 Command generation unit
3249 Rotation target determination unit
3250 Function update unit
40 Power control device

The invention claimed is:

1. A command generation device for generating a control command for an inverter configured to convert DC power output from a DC power source device into AC power synchronized with a frequency of a bus, the command generation device comprising:
 a rotation target determination unit configured to determine, on the basis of active power of the bus at which the inverter is connected, a target value of the rotation speed of a virtual generator configured to monotonically decrease with respect to the active power;
 a rotation calculation unit configured to calculate a rotation speed of the virtual generator on the basis of the determined target value of the rotation speed and a rotor model to simulate driving of the virtual generator and calculate the rotation speed of the virtual generator;
 a target power determination unit configured to determine target values of active power and reactive power of the inverter on the basis of the calculated rotation speed; and
 a command generation unit configured to generate a control command for the inverter on the basis of the determined target values of the active power and the reactive power.

2. The command generation device according to claim 1, further comprising:
 a function update unit, when an active power command is changed, configured to update an intercept of a droop function for defining a relationship between the active power of the bus at which the inverter is connected and the target value of the rotation speed of the virtual generator according to a difference in the active power command before and after being changed,
 wherein the rotation target determination unit is configured to determine the target value of the rotation speed of the virtual generator configured to monotonically decrease with respect to the active power on the basis of the droop function.

3. The command generation device according to claim 1, further comprising:
 A drive torque calculation unit configured to calculate a value related to a drive torque of the virtual generator on the basis of a governor model to determine a value related to the drive torque of the virtual generator, wherein the governor model determines the value on the basis of a difference between an active power of the bus at which the inverter is connected and an active power command of the bus which is input to the command generation device, a difference between a target value of the rotation speed of the virtual generator and the calculated rotation speed, and a difference between a target value and a measured value of a bus voltage, and
 wherein the rotation calculation unit is configured to calculate the rotation speed of the virtual generator on the basis of the calculated value related to the drive torque and the rotor model.

4. A command generation method for generating a control command for an inverter configured to convert DC power output from a DC power source device into AC power synchronized with a frequency of a bus, the command generation method comprising:
 a step of determining, on the basis of active power of the bus at which the inverter is connected, a target value of the rotation speed of a virtual generator configured to monotonically decrease with respect to the active power;
 a step of calculating a rotation speed of the virtual generator on the basis of the determined target value of the rotation speed and a rotor model to simulate driving of the virtual generator and calculates the rotation speed of the virtual generator;
 a step of determining a target value of active power of the inverter on the basis of the calculated rotation speed; and
 a step of generating a control command for the inverter on the basis of the determined target value of the active power.

* * * * *